United States Patent [19]

Bodlaj

[11] 4,068,955
[45] Jan. 17, 1978

[54] CONTACT-FREE THICKNESS MEASURING METHOD AND DEVICE

[75] Inventor: Viktor Bodlaj, Munich, Germany

[73] Assignee: Siemens Aktiengesellschaft, Berlin & Munich, Germany

[21] Appl. No.: 647,669

[22] Filed: Jan. 9, 1976

[30] Foreign Application Priority Data

Jan. 13, 1975 Germany .............................. 2501015

[51] Int. Cl.² ............................................. G01B 11/06
[52] U.S. Cl. ..................................... 356/167; 250/560; 250/578; 356/1
[58] Field of Search ........................ 356/160, 167, 4–5, 356/1, 138, 120, 209; 250/560, 578, 559

[56] References Cited

U.S. PATENT DOCUMENTS

| 3,536,405 | 10/1970 | Flower ................................. 250/578 |
| 3,760,184 | 9/1973 | Brose .................................. 250/578 |
| 3,802,774 | 4/1974 | Eschler et al. ........................ 250/560 |
| 3,870,890 | 3/1975 | Binks et al. .......................... 250/560 |

OTHER PUBLICATIONS

Bodlan, Dr. V., "Thickness, Distance & Velocity Measurements from Objects with the Aid of a Piezoelectric Laser Beam Deflector", Mess. & Pruf., (Germany), 12-1972, pp. 778-782.

*Primary Examiner*—John K. Corbin
*Assistant Examiner*—Wm. H. Punter
*Attorney, Agent, or Firm*—Hill, Gross, Simpson, Van Santen, Steadman, Chiara & Simpson

[57] ABSTRACT

A method and device for the contact-free measurement of the thickness of a workpiece having first and second surfaces which are opposite and plane-parallel to each other characterized by providing a single laser beam, deflecting the laser beam, splitting the deflected laser beam into two sub-beams which are directed to opposite sides of a reference plane, reflecting at least a portion of each of the sub-beams towards the reference plane so that each portion is moved on one of the first and second surfaces of the workpiece from an initial position to a position in which the surface reflects the beam along a given path to a sensing device associated with each of the portions of the sub-beams. By calculating the angle of movement based on a lapse time for the portion to move from an initial position to the position causing the detection of a reflected beam, the distance of the deflecting point on one of the surfaces of the workpiece can be determined. If the surfaces of the workpiece are substantially parallel to the reference plane, the thickness of the workpiece can be determined by utilizing the distance of one point on each of the first and second surfaces from the reference plane. If the workpiece is tilted about an axis which is parallel to the reference plane, the thickness may be determined by utilizing two points on one surface and one point on the second surface to determine the thickness. If the workpiece is tilted about all axes relative to the reference plane, the thickness may be determined by utilizing the distances of two points on each of the first and second surfaces of the workpiece.

3 Claims, 3 Drawing Figures

CONTACT-FREE THICKNESS MEASURING METHOD AND DEVICE

BACKGROUND OF THE INVENTION

1. Field of the Invention

The present invention is directed to a process and device for the contact-free measurement of the thickness of a workpiece having first and second surfaces which are opposite and plane-parallel to each other by deflecting a portion of a laser beam in a step-wise fashion across each of the surfaces, sensing a reflected beam which follows a given path for each of the portions of the laser beam to determine the angle between an initial position of the portion of the laser beam and the position causing the reflected beam that is detected, calculating the distance of the point of reflection from a reference plane, and then using the distance of various points to determine the thickness of the workpiece.

2. Prior Art

A process for measuring the thickness of a workpiece utilizing a plurality of laser beams is disclosed in U.S. Pat. No. 3,802,774. In this patent, at least one laser is disposed on each side of the workpiece. Each laser is provided with an acousto-optical light deflector to deflect the beam emitted thereby in a stepped fashion over the surface of the workpiece where they are deflected in diffused fashion and are recorded by detectors which are arranged at a distance from the surface and can only receive light traveling along one given path. The dimension of the workpiece is determined from the time difference between the beginning of the deflection of each laser beam and the time of detecting the reflected beam.

A disadvantage of this measuring process is that two complete laser systems and two light deflectors are required. The measuring accuracy can be impaired by external influences in either of the two laser systems which are installed separately.

SUMMARY OF THE INVENTION

The present invention is directed to a method and a device for measuring the thickness of plane-parallel workpieces which method and device can determine the thickness of a tilted workpiece independently of external influences.

To accomplish this aim, the workpiece, which has first and second surfaces which are opposite and plane-parallel surfaces, is disposed adjacent a reference plane of a device having means for creating a laser beam, means for splitting the laser beam into at least two sub-beams, means for directing the sub-beams to opposite sides of the reference plane, means for reflecting at least a portion of the sub-beams at the reference plane and having at least one reflecting surface on each side of said reference plane so that each of said first and second surfaces of the workpiece is struck by at least one portion, means for causing each of the portions to move periodically across the respective surface of the workpiece from an initial position and back, and separate sensing means associated with each of the portions for detecting a beam reflected by a scattering point on one of said first and second surfaces arriving along a given path, each portion while in the initial position and the given path for the associated sensing means intersecting at a point in the reference plane with the initial position forming an angle $\alpha$ with a normal of the reference plane and the given path forming an angle $\beta$ with the normal, said method comprising splitting the laser beam, directing the sub-beams, reflecting portions at the first and second surfaces of the workpiece, deflecting said portions from the initial position so that at least one portion moves along each of said first and second surfaces which reflects the respective portion in a diffused fashion as a reflected beam; sensing each reflected beam from a scattering point on the surface of the workpiece as the reflected beam assumes the given path; measuring the time lapse for the initial position of each portion until the reflected beam is sensed; converting each of the time lapses into a deflection angle $\gamma$; calculating a distance $d_i$ of each scattering point from the reference plane according to $$d_i = A_i \frac{\sin \gamma_i}{\sin(\alpha + \beta \pm \gamma_i)} \cdot \frac{\cos \beta}{\cos \alpha},$$

where $i = 1, 2, 3$ or $4$ wherein $\gamma_i$ is the angle between the initial position and the position when a reflected beam of a given path is detected for the portion $i$, $A_i$ is the distance between the reference plane and the reflector $i$, $\gamma_i$ being positive when the angle of incidence of the portion increases and being negative when the angle decreases; and subsequently establishing the thickness $d$ of the workpiece according to $$d = \frac{(d_1 - d_3)(d_1 + d_2) + (d_1 + d_3)(d_2 - d_1) + (d_1 - d_4)(d_1 + d_2) + (d_1 + d_4)(d_2 - d_1)}{2\sqrt{(d_1 + d_2)^2 + (d_2 - d_1)^2}}$$

Preferably, the deflecting means is a piezoceramic laser beam deflector disposed between the means for producing the laser and the means for splitting the beam into two sub-beams so that each of the sub-beams are deflected at the same speed and direction. Preferably, the means for reflecting comprises a prism disposed on each side of the reference plane with each prism having a first reflecting surface which is a partially mirrored surface and a second reflecting surface which is a completely mirrored surface so that two separate spaced portions are directed at each of the first and second surfaces of the workpiece.

The method and apparatus possesses many advantages including a high measuring speed, only a slight sensitivity to interference from external sources, a measuring accuracy which is not influenced by a longitudinal displacement or rotation of the deflecting reflectors. It is also possible to determine the thickness of a workpiece which is executing arbitrary tilting movements at the time of measurement. The device of the invention utilizes only a single laser and a single beam deflector.

DESCRIPTION OF THE PREFERRED EMBODIMENTS

Figure 1:
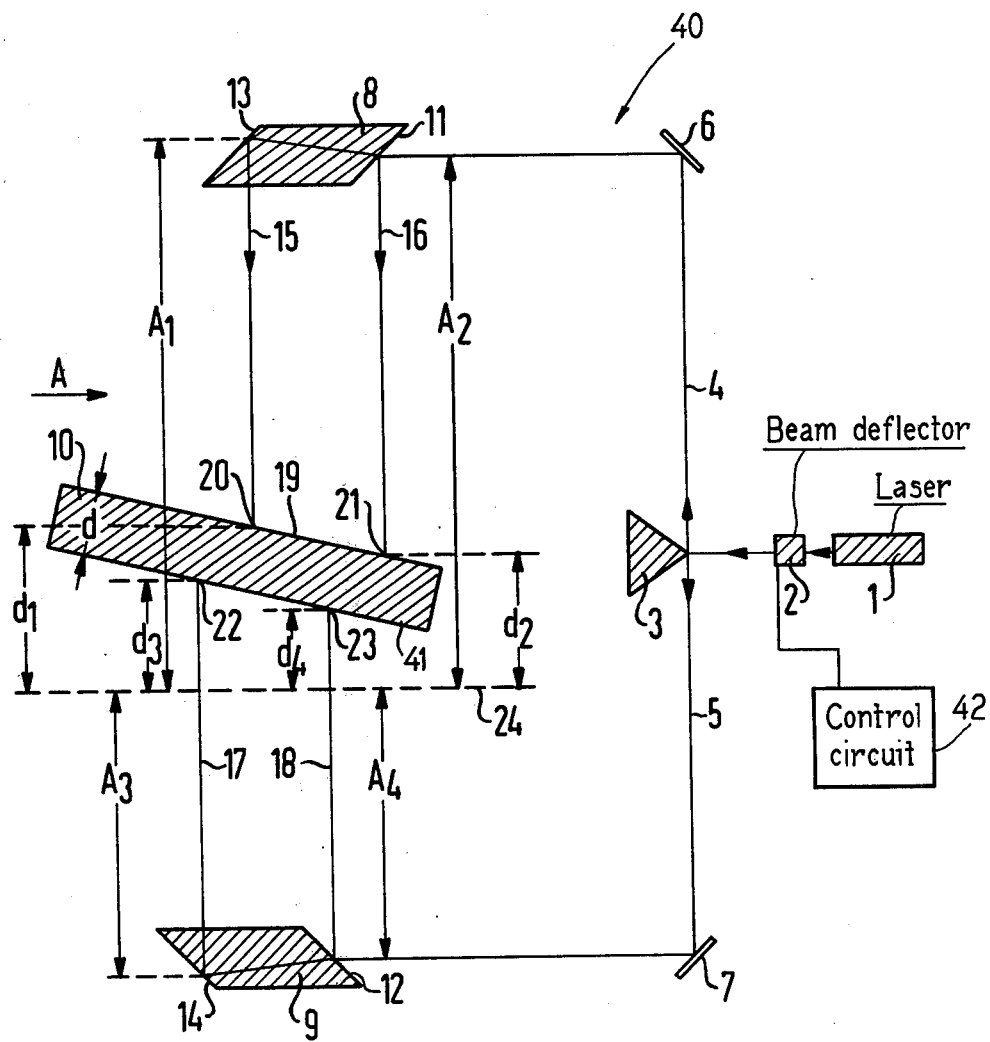
FIG. 1 is a side view with portions in cross section for purposes of illustration.

The principles of the present invention are particularly useful in a device generally indicated at 40 in FIG. 1 for contact-free measurement of a thickness d of a workpiece 10 having a first surface 19 and a second surface 41 which surfaces are opposite surfaces determining the boundary of the workpiece and are plane-parallel surfaces. As illustrated, the workpiece 10 is tilted in the plane of FIG. 1 and to a reference or zero plane 24 of the device 40.

The device 40 comprises a laser 1 which creates a continuous laser beam which is directed to pass through a light deflector 2 which is preferably an piezoceramic laser deflector having a piezo-electric transducer which is driven by a control circuit 42. The light deflector 2 deflects the laser beam along a line extending perpendicular to the plane of the drawing at a prism 3 which extends in the same direction and splits the beam into two sub-beams 4 and 5 which are directed in opposite directions. Means for directing the sub-beams 4 and 5 include a deflecting reflector 6, which directs the sub-beam 4 on one side of the reference or zero plane 24 and parallel thereto, and a deflecting reflector 7, which directs the sub-beam 5 on an opposite side of the reference plane 24 and parallel thereto. The sub-beam 4, as deflected by the reflector 6, is received by a reflecting means illustrated as a prism 8 having a first reflecting surface 11 which is a partially reflective or mirrored surface and reflects a portion of the sub-beam as a portion or sub-beam 16 at the surface 19. The prism 8 has a second reflecting surface 13, which is completely reflective or total mirrored surface and reflects the remaining portion 15 of the sub-beam 4 at the surface 19 of the workpiece. The sub-beam 5 is directed by the deflecting reflector 7 at a prism 9 which has a partially reflective or mirrored surface 12 and a total mirrored surface 14. The surface 12 reflects a portion 18 of the sub-beam 5 at the surface 41 of the workpiece while the mirror 14 reflects the remaining portion of the sub-beam as a portion 17 at the surface 41. The device 40 includes a separate sensing means such as a light detector for each of the portions 15-18.

As each of the portions 15-18 move along their respective surfaces 19 and 41 of the workpiece 10, they are reflected in a diffused manner. At a given scattering point or deflection point illustrated at 20-23 for the four portions 15-18, each of the reflected beams will lie in a given path to be received by an individual detector associated with each beam (not illustrated in FIG. 1). The distances of each of the scattering points 20-23 from the reference plane 24 is indicated as $d_1$, $d_2$, $d_3$ and $d_4$, respectively. In addition, FIG. 1 illustrates the distances of each of the reflector surfaces 11-14 from the reference plane 24 as $A_1$, $A_2$, $A_3$ and $A_4$, respectively.

Figure 2:
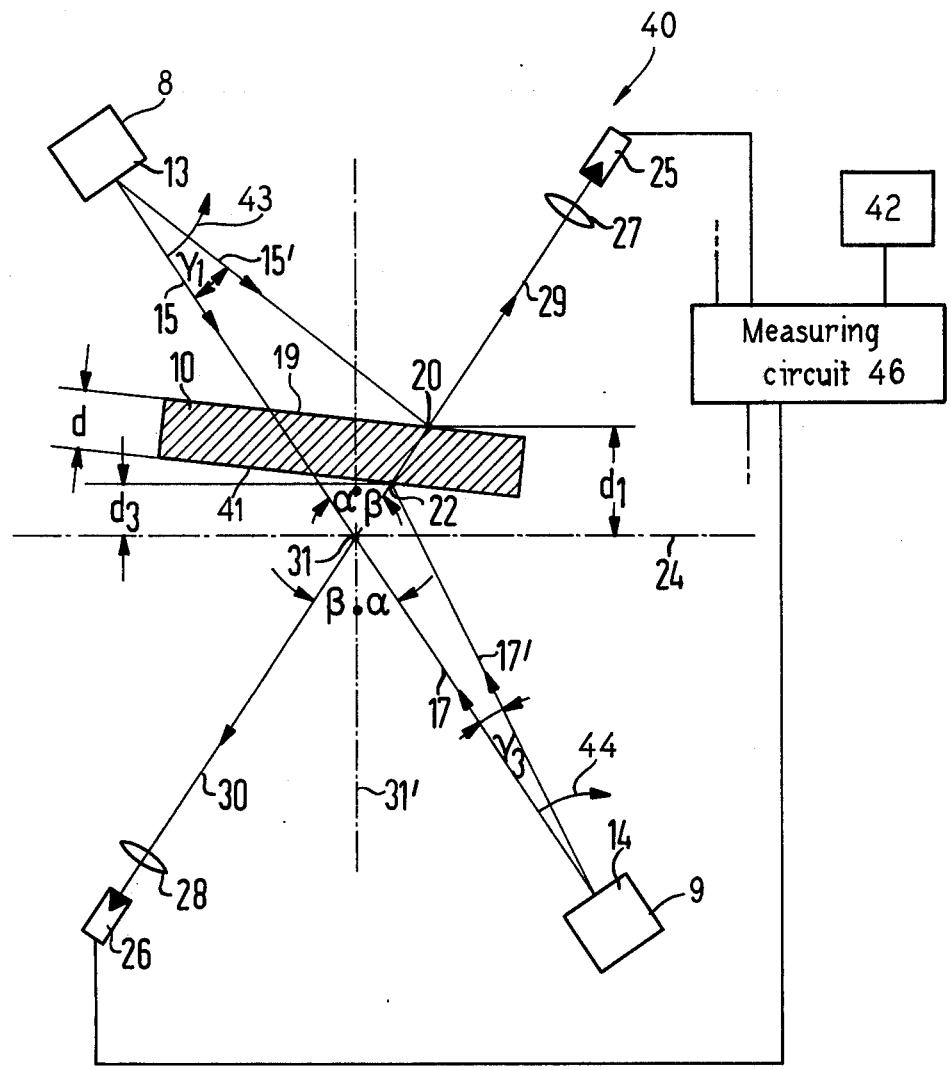
FIG. 2 is an end view taken in direction of arrow A of the device of FIG. 1 with portions in cross section for purposes of illustration.

In FIG. 2 an end view of the device of FIG. 1 taken from the direction of arrow A enables a further explanation of the process of measuring or calculating the thickness d of the workpiece 10. As illustrated in FIG. 2, the workpiece 10 is also tilted in the plane of the figure so that the surfaces 19 and 41 of the workpiece are skewed to both the axis of the plane 24 that lies in the plane of FIG. 2 and an axis that extends perpendicular thereto.

In FIG. 2, only the reflected surfaces 13 and 14 of the prisms 8 and 9 are illustrated, and thus, only the portions 15 and 17 of the sub-beams are illustrated. For the portion 15 a sensing means comprising a light detector 25 which is capable of only detecting light on a given path 29 is provided. In a similar manner for the beam 17, a light detector 26 which is capable of detecting only light on a given path 30 is provided. Each of the detectors 25 and 26 may have a pair of spaced aligned apertures similar to the detectors illustrated in the above-mentioned United States patent. To facilitate the focusing of light on a path 29 into the detector 25, a lens 27 is provided, and in a similar manner a lens 28 is provided for the detector 26.

As illustrated, when the portion 15, which is reflected from the surface 13 is in an initial or starting position, it will intersect the given direction 29 for the detector 25 in the plane 24 at a point 31. When the portion 17, which is reflected by the surface 14, is in an initial position, it will intersect the given path 30 in the plane 24 at a point on a line extending from point 31 and perpendicular to the plane of the figure. Each of the portions 15 and 17 form an angle $\alpha$ with a line 31' which is a normal to the reference plane 24. In a similar manner, each of the given directions 29 and 30 form an angle $\beta$ with the normal 31'. While not illustrated, the detectors for the portions 16 and 18 will each have a given path which will intersect with the starting or initial position of the portions 16 and 18 and which form an angle $\beta$ with a normal of the plane 24, the portions 16 and 18 while in the initial position will form the angle $\alpha$ with their respective normals.

As the beam deflector 2 causes the laser beam to be deflected along the prism 3 (FIG. 1), each of the portions 15-18 will be moved along their respective surfaces 19 and 41 of the workpiece 10. As illustrated in FIG. 2, the portion 15 will more from the initial position in a direction of arrow 43 while the portion 17 will be moved from its initial position in the direction of arrow 44. It should be noted that portion 16 will move in the same direction as position 15 and that portion 18 will move in the same direction as portion 17. In other words, portions 16 and 18 lie directly behind portions 15 and 17, respectively, when looking at FIG. 2.

As portion 15 moves from its initial position in the direction of arrow 43, it will move along the surface 19 with its light being reflected therefrom. As the portion 15 moves along the surface, it reaches a scattering point 20 in which the reflected beam lies on the given path 29 and will be received by the detector 25. The position of the portion when striking the scattering point 20 to cause a reflected beam to be received by the detector 25 is indicated at 15'. In a similar manner, portion 17 moves in the direction of arrow 44 along the surface 41 until it reaches a scattering point 22, which produces a reflected beam lying on the given path 30 for the detector 26. At the time of striking the scattering point 22, the portion will have a position indicated as 17'. The angle between initial position for portion 15 and the position 15' is indicated as $\gamma_1$ and the angle between the initial position of portion 17 and the position 17' is $\gamma_3$.

Each of the detectors such as 25 and 26 have their output supplied to a measuring circuit 46 which also receives an output from the control circuit 42 of the piezo-electric transducer. The measuring circuit 46 includes means which will determine or measure the time lapse between the starting or commencement of the deflection with each of the portions 15-18 in the initial position and when the detector associated with each of the portions 15-18 receives a reflected signal. Using the time lapse of each portion 15-18 which will be different due to the tilting of the workpiece, the measuring circuit has means to convert the different lapses into angles $\gamma_1 - \gamma_4$ for each of the portions 15–18 and means to calculate each of the distances $d_1$, $d_2$, $d_3$, $d_4$ in accordance to $$d_i = A_i \frac{\sin \gamma_i}{\sin(\alpha + \beta \pm \gamma_i)} \cdot \frac{\cos \beta}{\cos \alpha}$$

where $i = 1,2,3$ and 4.

It is noted that the angles $\alpha$ and $\beta$ are fixed and can be predetermined by the particular configuration of the device 40. Also, the distances $A_i$ are a known distances. Thus, the measuring circuit 46 includes a computer circuit capable of giving the distance $d_i$ in response to the measured angle $\gamma_i$.

After determining the various distances $d_1$, $d_2$, $d_3$, $d_4$, the measuring circuit can compute or calculate the thickness $d$ of the workpiece which is a function of the distances in accordance to $$d = \frac{(d_1 - d_3)(d_1 + d_2) + (d_1 + d_3)(d_2 - d_1) + (d_1 - d_4)(d_1 + d_2) + (d_1 + d_4)(d_2 - d_1)}{2\sqrt{(d_1 + d_2)^2 + (d_2 - d_1)^2}}$$

Thus, the measuring circuit 46 provides means for determining a time lapse between the initial position of each of the position of each of the portions 15–18 and the position at which the respective detector receives a reflected beam, means for converting the time lapse into the angle $\gamma$ of movement of each of the portions 15–18, means for calculating the distance $d_i$, and means for calculating the thickness $d$ of the workpiece. The measuring circuit can have a simple computer circuit which, when provided with the angle of deflection $\gamma_i$ based on the time lapse calculates each of the distances and then calculates the thickness $d$ which will be function of the distances $d_1$, $d_2$, $d_3$, $d_4$ and be displayed in a conventional manner either alone or also with the distances $d_1$–$d_4$.

By obtaining the four distances for the four scattering points 20–23, the thickness $d$ of the workpiece 10 can be determined regardless of the fact that the workpiece 10 is tilted around all axes relative to the reference plane 24.

If the workpiece 10 is tilted around only one axis which is in the reference plane 24 and which axis extends at right angles to a line connecting the two scattering point on one side of the workpiece, only three portions of the laser beams are required to determine the thickness $d$ of the workpiece 10. Thus, a device may be used which has one prism for directing two portions 15 and 16 at one surface and a single reflector for directing a single portion 17 at the opposite surface.

Figure 3:
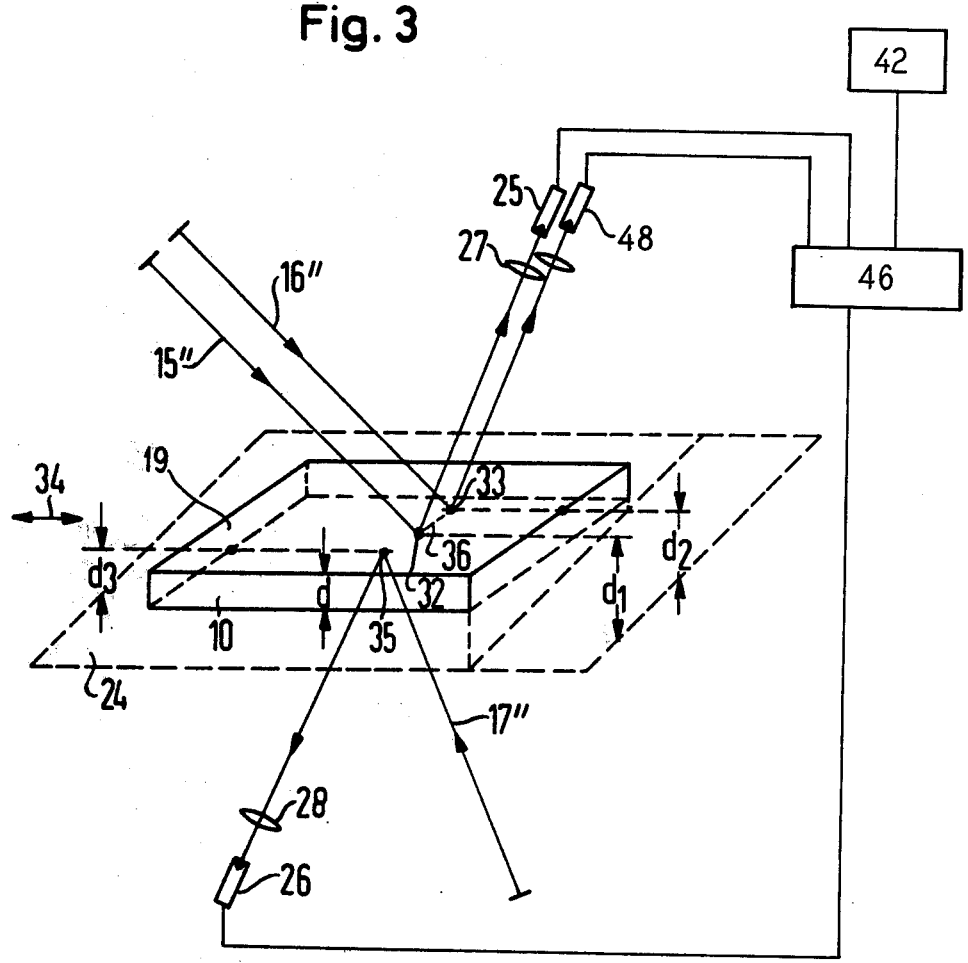
FIG. 3 is an isometric view illustrating the movement of the beams during a measuring operation.

Such an arrangement is illustrated in FIG. 3 with two portions directed at the first surface 19 and only one portion directed at the opposite second surface of the workpiece. As illustrated in FIG. 3, the portions are shown at the position in which they strike a scattering point which will create a reflected beam on the given path for each of the respective detectors. Thus, portion 15" strikes a scattering point 32 while portion 16" strikes a scattering point 33 and is reflected along a given path for a detector 48. The scattering points 32 and 33 are illustrated as interconnected by a line 36 and the workpiece is tilted on an axis extending in a direction 34 which extends at right angles to the line 36. The scattering points 32 and 33 which are on the first surface 19 of the workpiece are spaced from the reference planes 20–24 by the distances $d_1$ and $d_2$, respectively. The portion 17" which is reflected off the second surface, has a scattering point 35 which has a distance $d_3$ from the reference plane 24. In order to determine the thickness of the workpiece 10, it is sufficient to use a single portion which is directed towards the lower or second surface of the workpiece since all points on the surface along a line which is parallel to the direction 34 are parallel to the zero plane 24 and will have the same distance therefrom.

In this embodiment, the distances $d_1$, $d_2$, $d_3$ are calculated as in the previous embodiment. To determine the thickness $d$ of the workpiece, the distances $d_1$, $d_2$ and $d_3$ are used and the distance $d_4$ of the equation is taken to be equal to the distance $d_3$.

If the workpiece 10 is untilted relative to the reference plane 24 or has a tilt of less than 3° to the reference plane, the thickness $d$ of the workpiece can be obtained using only two portions such as 15 and 17 with one portion being directed to the first surface and the second portion being directed at the second surface of the workpiece. When calculating the thickness $d$ of the workpiece, the value $d_2 = d_1$ and the value $d_4 = d_3$. The formula for determining the thickness then becomes $d = d_1 - d_3$.

The method and the device can be used for high speed measurement of the thicknesses of metal sheets, plates or foils and is capable of determining the thicknesses of these sheets, plates and foils when they are tilted and moving in an arbitrary fashion.

Although various minor modifications may be suggested by those versed in the art, it should be understood that I wish to employ within the scope of the patent granted hereon, all such modifications as reasonably and properly come within the scope of my contribution to the art.

I claim:

1. A method for the contact-free measurement of the thickness of a workpiece having first and second surfaces which are opposite and plane-parallel to each other, said workpiece being disposed adjacent a reference plane of a device having means for providing a laser beam, means for splitting the laser beam into at least two sub-beams, means for directing the sub-beams to opposite sides of the reference plane, means for reflecting at least a portion of each of the sub-beams at the reference plane and having at least one reflecting surface on each side of said reference plane so that each of said first and second surfaces of the workpiece is struck by at least one portion, means for causing each of the portions to move periodically across the respective surface of the workpiece from an initial position and back, and separate sensing means associated with each of the portions for detecting a beam reflected by a scattering point on one of said first and second surfaces arriving along a given path, each portion while in the initial position and the given path for the associated sensing means intersecting at a point in the reference plane with the initial position forming an angle $\alpha$ with a normal of the reference plane and the given path forming an angle $\beta$ with the normal, said method comprising splitting the laser beam; directing the sub-beams; creating two separate spaced portions of each sub-beam and reflecting the portions at the first and second surfaces of the workpiece; deflecting said portions from the initial position, so that two portions move along each of said first and second surfaces which reflect the respective portion in a diffused fashion as a reflected beam; sensing each reflected beam from a scattering point on the surface of the workpiece as the reflected beam assumes the given path; measuring the time lapse from the initial position of each portion until the reflected beam is sensed; converting each of the time lapses into a deflection angle $\gamma$; calculating the distance $d_i$ of each scattering point from the reference plane according to $$d_i = A_i \frac{\sin \gamma_i}{\sin(\alpha + \beta \pm \gamma_i)} \cdot \frac{\cos \beta}{\cos \alpha}$$

where $i = 1, 2, 3$ and $4$,
wherein $\gamma_i$ is the angle between the initial position and the position when a reflected beam of the given path is detected for the portion $i$, $A_i$ is the distance between the reference plane and the reflector $i$, $\gamma_i$ being positive when the angle of incidence of the portion increases and being negative when the angle decreases; and subsequently calculating the thickness $d$ of the workpiece according to $$d = \frac{(d_1 d_3)(d_1+d_2)+(d_1+d_3)(d_2-d_1)+(d_1-d_4)(d_1+d_2)+(d_1+d_4)(d_2-d_1)}{2\sqrt{(d_1+d_2)^2+(d_2-d_1)^2}},$$

so that a thickness of a workpiece, which is tilted in relation to the reference plane about two perpendicular axes which are parallel to the reference plane, can be determined.

2. A device for the contact-free measurement of a thickness of a workpiece having first and second surfaces which are opposite and plane-parallel to each other, said device comprising means for creating a single laser beam; means for splitting the laser beam into at least two sub-beams; means for directing each of the sub-beams to opposite sides of a reference plane; means for reflecting at least a portion of each of the sub-beams at the reference plane, said means for reflecting comprising a prism disposed on each side of the reference plane, each prism having a partially mirrored surface and a completely mirrored surface so that two portions are directed from each prism and each of said first and second surfaces of the workpiece which is disposed adjacent to the reference plane is struck by the two portions; means for causing each of the portions of the sub-beams to move periodically across the respective surface of the workpiece from an initial position and back, said means for causing comprises a piezo-electric beam deflector disposed between the means for providing a laser beam and the means for splitting so that all the sub-beams are deflected at the same speed and direction; a separate sensing means associated with each of the portions of the sub-beams for detecting a reflected beam arriving along a given path, said reflected beam being reflected by a scattering point on one of said first and second surfaces in a diffused fashion, said initial position of each portion and the given path for the associated sensing means intersecting at a point in the reference plane with the initial position forming an angle $\alpha$ with a normal of the reference plane and the given path forming an angle $\beta$ with the normal; means for measuring the time lapse from the initial position of each portion until the reflected beam is sensed and for converting each time lapse into a deflection angle $\gamma$; means for calculating the distance $d_i$ of each scattering point from the reference plane according to $$d_i = A_i \frac{\sin \gamma_i}{\sin(\alpha + \beta \pm \gamma_i)} \cdot \frac{\cos \beta}{\cos \alpha}$$

where $i = 1, 2, 3$ and $4$,
wherein $\gamma_i$ is the angle between the initial position and the position when the reflected beam of the given path is detected for a portion $i$, $A_i$ is the distance between the reference plane and the reflector $i$, $\gamma_i$ being positive when the angle of incidence of the portion increases and being negative when the angle decreases; and means for calculating the thickness $d$ of the workpiece according to $$d = \frac{(d_1 - d_3)(d_1 + d_2) + (d_1 + d_3)(d_2 - d_1) + (d_1 - d_4)(d_1 + d_2) + (d_1 + d_4)(d_2 - d_1)}{2\sqrt{(d_1+d_2)^2 + (d_2-d_1)^2}}$$

3. A method for the contact-free measurement of the thickness of a workpiece having first and second surfaces which are opposite and plane-parallel to each other, said workpiece being disposed adjacent a reference plane of a device having means for providing a laser beam, means for splitting the laser beam into at least two sub-beams, means for directing the sub-beams to opposite sides of the reference plane, means for reflecting at least a portion of each of the sub-beams at the reference plane and having at least one reflecting surface on each side of said reference plane so that each of said first and second surfaces of the workpiece is struck by at least one portion, means being disposed between the means for providing a laser beam and the means for splitting for causing each of the portions to move periodically across the respective surface of the workpiece from an initial position and back, and separate sensing means associated with each of the portions for detecting a beam reflected by a scattering point on one of said first and second surfaces arriving along a given path, each portion while in the initial position and the given path for the associated sensing means intersecting at a point in the reference plane with the initial position forming an angle $\alpha$ with a normal of the reference plane and the given path forming an angle $\beta$ with the normal, said method comprising deflecting the laser beam from an initial position; splitting the deflected laser beam; directing the sub-beams; creating two separate spaced portions of each sub-beam and reflecting the portions at the first and second surfaces of the workpiece, said deflecting causing each of said portions to be deflected from the initial position simultaneously and at the same rate, so that two portions moves along each of said first and second surfaces which reflect the respective portion in a diffused fashion as a reflected beam; sensing each reflected beam from a scattering point on the surface of the workpiece as the reflected beam assumes the given path; measuring the time lapse from the initial position of each portion until the reflected beam is sensed; converting each of the time lapses into a deflection angle $\gamma$;

calculating the distance $d_i$ of each scattering point from the reference plane according to $$d_i = A_i \frac{\sin \gamma_i}{\sin(\alpha + \beta \pm \gamma_i)} \cdot \frac{\cos \beta}{\cos \alpha}$$

where $i = 1,2,3$ and $4$
wherein $\gamma_i$ is the angle between the initial position and the position when a reflected beam of the given path is detected for the portion $i$, $A_i$ is the distance between the reference plane and the reflector $i$, $\gamma_i$ being positive when the angle of incidence of the portion increases and being negative when the angle decreases; and subsequently calculating the thickness $d$ of the workpiece according to $$d = \frac{(d_1 - d_3)(d_1 + d_2) + (d_1 + d_3)(d_2 - d_1) + (d_1 - d_4)(d_1 + d_2) + (d_1 + d_4)(d_2 - d_1)}{2\sqrt{(d_1 + d_2)^2 + (d_2 - d_1)^2}}$$

so that a thickness of a workpiece, which is tilted in relation to the reference plane about two perpendicular axes which are parallel to the reference plane, can be determined.

* * * * *